United States Patent [19]

Kulkarni

[11] Patent Number: 5,768,557
[45] Date of Patent: *Jun. 16, 1998

[54] LOW COST WRITETHROUGH CACHE COHERENCY APPARATUS AND METHOD FOR COMPUTER SYSTEMS WITHOUT A CACHE SUPPPORTING BUS

[75] Inventor: Upendra M. Kulkarni, Sacramento, Calif.

[73] Assignee: Intel Corporation, Santa Clara, Calif.

[ * ] Notice: The term of this patent shall not extend beyond the expiration date of Pat. No. 5,551,006.

[21] Appl. No.: 664,138

[22] Filed: Jun. 13, 1996

Related U.S. Application Data

[62] Division of Ser. No. 130,025, Sep. 30, 1993, Pat. No. 5,551,006.

[51] Int. Cl.[6] .................................................. G06F 12/00
[52] U.S. Cl. ...................................... 395/473; 315/462
[58] Field of Search ................................. 395/842, 846, 395/843, 868, 462, 468, 445, 473

[56] References Cited

U.S. PATENT DOCUMENTS

| | | | |
|---|---|---|---|
| 4,167,782 | 9/1979 | Joyce et al. | 395/468 |
| 4,700,330 | 10/1987 | Altman et al. | 365/222 |
| 5,157,774 | 10/1992 | Culley | 395/466 |
| 5,210,847 | 5/1993 | Thome et al. | 395/465 |
| 5,255,374 | 10/1993 | Aldereguia et al. | 395/293 |
| 5,276,852 | 1/1994 | Callender et al. | 395/309 |
| 5,325,504 | 6/1994 | Tipley et al. | 395/455 |
| 5,367,659 | 11/1994 | Iyengar et al. | 395/463 |
| 5,394,529 | 2/1995 | Brown, III et al. | 395/587 |
| 5,414,820 | 5/1995 | McFarland et al. | 395/308 |
| 5,423,019 | 6/1995 | Liu | 395/462 |
| 5,428,760 | 6/1995 | Ghori et al. | 395/476 |
| 5,440,751 | 8/1995 | Santeler et al. | 395/800 |
| 5,551,006 | 8/1996 | Kulkarni | 395/473 |

*Primary Examiner*—David L. Robertson
*Attorney, Agent, or Firm*—Blakely, Sokoloff, Taylor & Zafman

[57] ABSTRACT

A method for supporting a writethrough cache in a computer system not otherwise supporting cache is disclosed. Cache coherency is guaranteed by a cache coherency module detecting the CPU programming a DMA controller to allow a device other than the CPU to transfer data to main memory and, until the data transfer is concluded, flushing the cache each time the CPU reads an address other than an address of a standard computer system component. The cache is also flushed upon conclusion of the data transfer. In computer systems including a bus master device, the cache is flushed whenever the cache coherency module detects the CPU reading an address other than an address of a standard computer system component and whenever the cache coherency module detects an interrupt other than a standard computer system interrupt. Also disclosed a method to automatically determine the range of cacheable addresses in the computer system and to turn on the cache after the computer system is reset.

6 Claims, 11 Drawing Sheets

ISA Architecture

MCA

FIG. 5

| I/O Address | Description |
|---|---|
| 0000h | DMA channel 0, memory address register |
| 0001h | DMA channel 0, transfer count register |
| 0002h | DMA channel 1, memory address register |
| 0003h | DMA channel 1, transfer address register |
| 0004h | DMA channel 2, memory count register |
| 0005h | DMA channel 2, transfer count register |
| 0006h | DMA channel 3, memory address register |
| 0007h | DMA channel 3, transfer count register |
| 0008h | DMA channel 0-3, status register |
| 000Bh | DMA channel 0-3, mode register |
| 000Ch | DMA Clear Byte Pointer |
| 000Dh | DMA Master Clear Byte |
| 0081h | DMA channel 2, page table address register |
| 0082h | DMA channel 3, page table address register |
| 0083h | DMA channel 1, page table address register |
| 0087h | DMA channel 0, page table address register |
| 0089h | DMA channel 6, page table address register |
| 008Ah | DMA channel 7, page table address register |
| 008Bh | DMA channel 5, page table address register |
| 008Fh | DMA channel 4, cascade to channels 5-7 |
| 00C0h | DMA channel 4, memory address register |
| 00C2h | DMA channel 4, transfer count register |
| 00C4h | DMA channel 5, memory address register |
| 00C6h | DMA channel 5, transfer count register |
| 00C8h | DMA channel 6, memory address register |
| 00CAh | DMA channel 6, transfer count register |
| 00CCh | DMA channel 7, memory address register |
| 00CEh | DMA channel 7, transfer count register |
| 00D0h | DMA channel 5-7 status register |
| 00D2h | DMA write request register |
| 00D6h | DMA channel 5-7 mode register |
| 00D8h | DMA Clear Byte Pointer |
| 00DAh | DMA Master Clear Byte |

FIG. 6

| Standard I/O Addresses | 0000h-00FFh (exceopt 0008h and 00D0h)<br>0278h-027Bh<br>02F8h-02FFh<br>0378h-037Bh<br>03B4h-03B5h<br>03BAh, 03BCh-03CCAb, 03CCh<br>03CEh-03CFh<br>03D4h-03D5h, 03DAh<br>03F8h-03FFH |
|---|---|
| Non-Standard I/O Addresses | 0008h, 00D0h, 0100h-0277h<br>027Ch-02F7h<br>0300h-0377h<br>037Ch-03B3h<br>03B6h-03B9h<br>03BBh, 03CBh, 03CDh<br>03D0h-03D3h<br>03D6h-03D9h<br>03DBh-03F7h<br>0400h-FFFFh |
| Standard Memory Addresses | 00000000h-Maximum base memory address<br>A0001h-BFFFFh<br>E00001h-FFFFFh<br>00100000h-Maximum extended memory addresses |
| Non-Standard Memory Addresses | (Maximum base memory address + 1) - A0000hf<br>C0000h-E0000h<br>(Maximum extended memory address + 1) - FFFFFFFFh |
| Standard Interrupts: | IRQ0-IRQ2, IRQ8 and IRQ13 |
| Non Standard Interrupts: | IRQ3-IRQ7, IRQ9-IRQ12, IRQ14-IRQ15 |

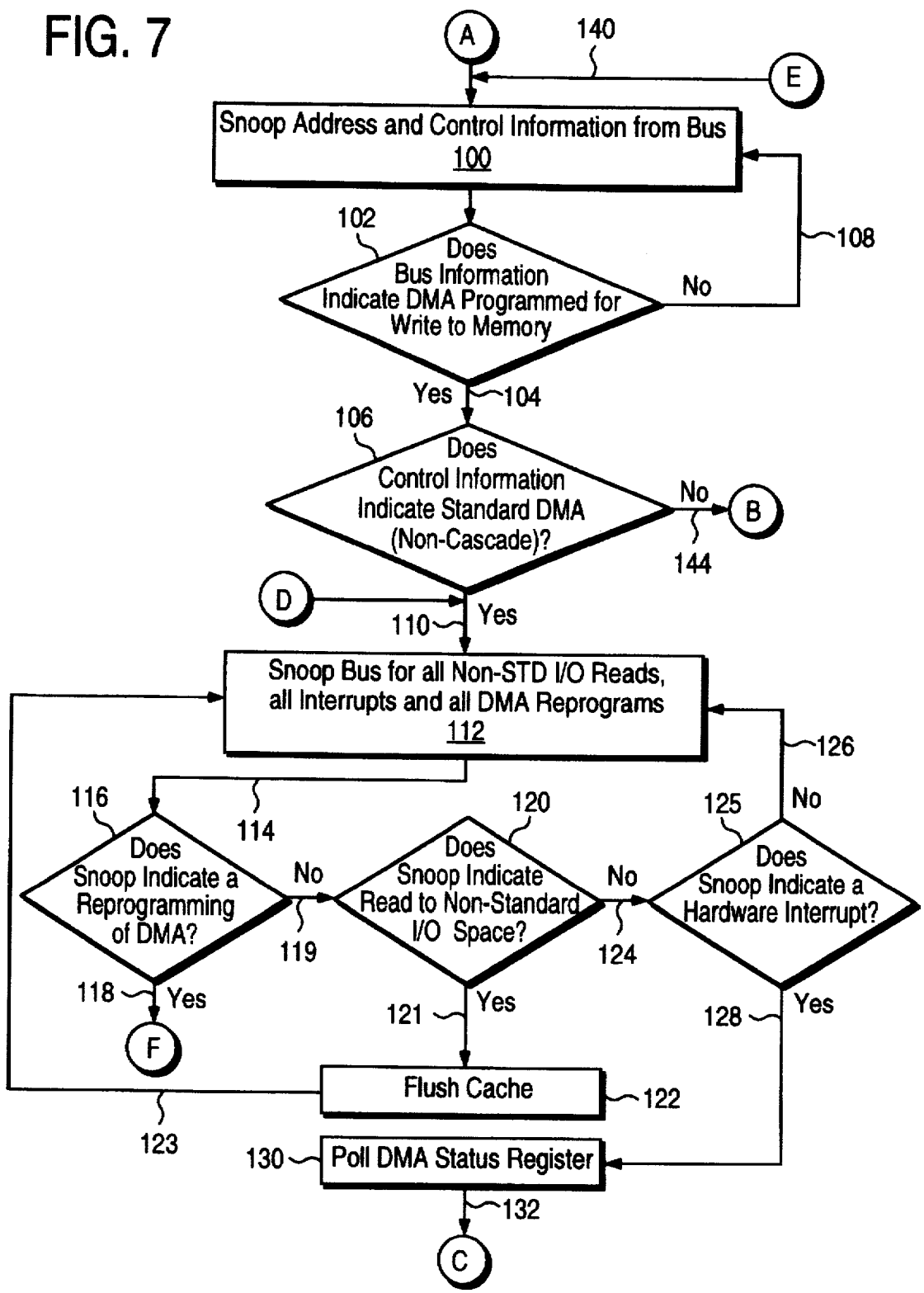

FIG. 11

| Address of Battery Back-up Memory | Information Stored |
|---|---|
| 15 | Conventional memory low byte |
| 16 | Conventional memory high byte |
| 17 | Extended memory low byte |
| 18 | Extended memory high byte |
| 30 | Alternate Extended memory low byte (ISA only) |
| 31 | Alternate Extended memory high byte (ISA only) |
| 35 | Alternate Extended memory low byte (MCA only) |
| 36 | Alternate Extended memory high byte (MCA only) |

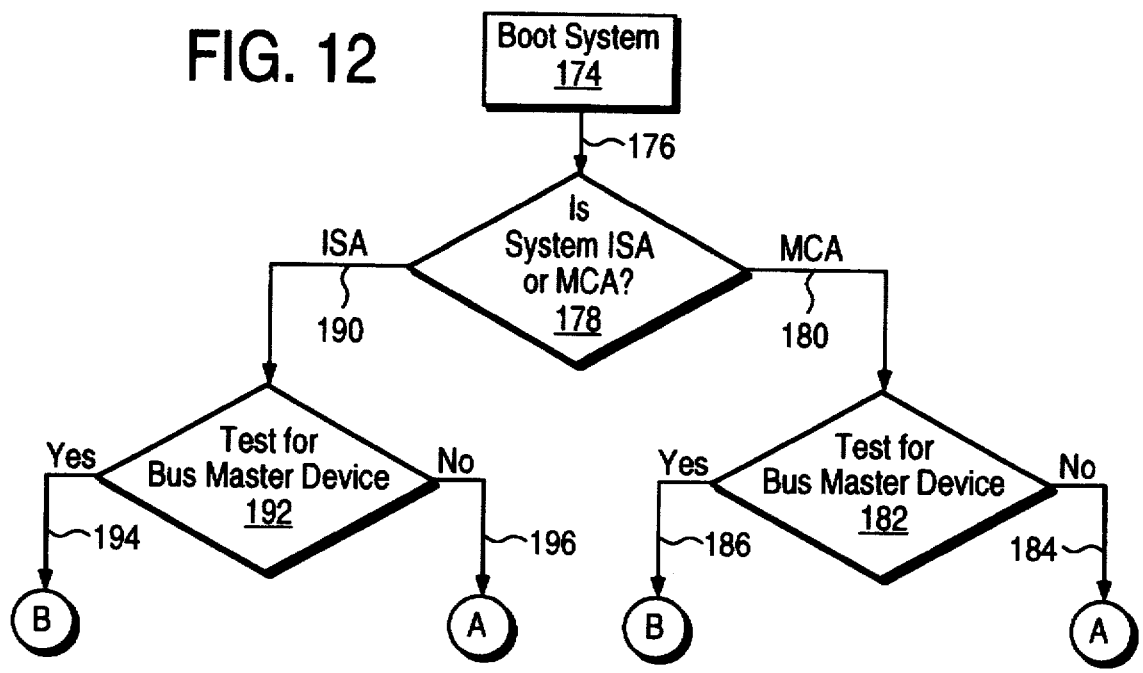

LOW COST WRITETHROUGH CACHE COHERENCY APPARATUS AND METHOD FOR COMPUTER SYSTEMS WITHOUT A CACHE SUPPPORTING BUS

This is a divisional of application Ser. No. 08/130,025, filed Sep. 30, 1993, now issued as U.S. Pat. No. 5,551,006 on Aug. 27, 1996.

CROSS-REFERENCE TO RELATED APPLICATIONS

The following co-pending U.S. patent applications relate to the present application. Each of the listed co-pending applications are assigned to the same assignee as the present application.

1) U.S. patent application Ser. No. 08/228,145, Filed Apr. 15, 1994, and titled, "CACHE COHERENCY MECHANISM FOR WRITE BACK CACHES ON NON-WRITE BACK BUSSES", now issued as U.S. Pat. No. 5,555,398 on Sep. 10, 1996.

2) U.S. patent application Ser. No. 08/088,205, Filed Jul. 6, 1993, and titled, "CACHE COHERENCY MECHANISM FOR WRITEBACK CACHE ON NON-WRITEBACK BUSSES", now abandoned in favor of the file wrapper continuation in Ser. No. 08/752,008, filed Nov. 15, 1996, now pending.

3) U.S. patent application Ser. No. 07/998,938, Filed Dec. 30, 1992, and titled, "CACHE COHERENCY MAINTENANCE ON NON-CACHE SUPPORTING BUSES", now abandoned in favor of the file wrapper continuation Ser. No. 08/373,892 filed Jan. 17, 1995, now pending.

BACKGROUND OF THE INVENTION

Field of the Invention

The present invention relates to cache coherency control. More particularly, it relates to a writethrough cache coherency control module and method for computer systems having a bus that does not support caches.

A cache memory is a small very fast memory used to store frequently used instructions and data. Cache memory is a tradeoff between speed and cost. Ideally, a computer would have main memory that is as fast as the CPU. But while such memory exists, it is much more expensive than main memory. Fortunately, a phenomenon known as the locality of execution principle exists which makes caching possible. This principle states that the CPU tends to use the same memory locations regularly. In general, the CPU follows the 80/20 rule which states that 20% of the memory addresses will be used 80% of the time. This being the case, a small, very fast and expensive memory can be used in conjunction with a much larger, slower and inexpensive main memory to gain most of the performance of an all high speed main memory, but at a small fraction of the cost.

A typical cache memory consists of very fast static RAM and a very fast cache controller. In operation, when the CPU requests data from main memory, the cache controller checks to see if the data is in the cache. This check is done with very fast logic. Ideally, the speed of the cache is tuned to the speed of the CPU, and with on board caches this happens automatically. If the requested data is in the cache, it is delivered much more quickly than if it were in main memory. This situation is called a cache hit. If the requested data is not in the cache, the CPU must access the slower main memory for the data. This is called a cache miss. Data retrieved during a cache miss is also written to cache for future use. In order to write new data into cache, other data must be eliminated. This is called a line replacement in cache. The cache controller performs this function and attempts to maintain the most frequently used data in cache.

However there are architectural problems with a cache memory. A first problem occurs when the CPU has modified data in cache memory and an external device needs to read that data. The CPU has copied the data from some locations in main memory into its cache memory. The CPU may then be using and modifying the data in cache. There are then certain locations in main memory with data which may be different than the data in the corresponding locations in cache. This doesn't matter for the CPU since it always looks first in the cache and thus has the most current data. However, if an external device (one other than the CPU) needs the same data, it would read "stale" data.

A second problem occurs when the CPU has modified data in the cache and an external device writes new data into the corresponding locations in main memory. In this case, the data in the CPU cache becomes stale.

These two situations give rise to the general problem known as cache coherency. That is, how does the system insure that the CPU and all external devices are using the same data when a cache memory is employed.

The solution is of course simple when the CPU directly supervises all accesses to main memory. But, as will be discussed later, modern, high performance architectures allow external devices to access main memory directly.

The solution for the external device read problem is related to the writeback strategy. That is, whenever the CPU modifies the data in its cache, the issue is how does it write back into the main memory. There are two approaches known as writethrough and writeback.

In a writethrough cache scheme, whenever the CPU modifies any data in cache, it will immediately go to the same location in memory and write the new information there. The CPU will never modify data in the cache and leave it unmodified in the main memory. Thus a writethrough memory helps the CPU performance by speeding up the read cycle. In the cacheless case the CPU had to both read and write from main memory. With a writethrough cache, the CPU only has to write to main memory. But this approach assures the system that any device which accesses main memory will have access to exactly the same data as in the cache.

In a writeback cache scheme, the CPU does not modify the main memory in every memory cycle. Rather, the CPU keeps operating out of cache for so long as an external device does not seek access to the memory locations that have been cached.

In order to accomplish this the CPU monitors the address and control busses looking for requests from external devices for addresses in main memory that have been cached. This is known as "snooping". If the CPU detects such a request and the data in cache has been modified, the CPU issues a command known as an "abort" or a "backoff". A backoff command activates a protocol that is built into both the external device and the CPU. When the external device receives a backoff command, it stops the operation it was doing and gives control of the bus back to the CPU. The CPU then writes the modified data from the cache to the corresponding location in main memory and then gives the control of the bus back to the external device. The device will then re-execute the same cycle. With this protocol, the external device will get the updated data. The advantage of a writeback cache is that the CPU does not have to writethrough to main memory on every memory cycle. It need writeback to main memory only when there is a request from an I/O device. And since the number of I/O requests is tiny compared to CPU cycles, the writeback cache is a high performer. Thus, in this case, main memory is updated only as actually required.

In the case of an external I/O device seeking to write to a main memory address that has been cached and modified there by the CPU, an action known as "invalidation" is invoked. Since the CPU is always monitoring or "snooping" on the addresses that it has in the cache, each time that the CPU detects an address in main memory that is to be modified and which address has been cached, the CPU knows that there will be new data available to it, and the CPU invalidates that portion of the cache containing the data being modified in main memory. The CPU then accesses main memory to get the new data. Thus, an external device writing to memory is handled through snooping and invalidations. This scheme works with either writethrough or writeback cache coherency schemes.

Thus in a conventional implementation of a cache memory, the bus is designed to support one of the two coherency schemes: writethrough or writeback. In a writethrough scheme, the bus is designed to have the signals to be snooped available. In a writeback cache, the bus needs to not only have the signals to be snooped available, but also to have the backoff lines on the bus and the extra logic somewhere.

The early 8088 brand microprocessor through the 386 brand microprocessor manufactured by Intel Corporation did not have cache memory capability. And, the busses used in computers incorporating these microprocessors, did not support cache memory. That is, they did not contain snooping or backoff hardware.

Newer microprocessors manufactured by Intel Corporation, however, have included cache memory as part of their performance enhancement. For example, the Intel i486 brand microprocessor contains writethrough cache memory capability and the Intel Pentium brand microprocessor contains writeback cache capability. Thus, all new computers using these microprocessors contain some sort of cache memory.

However, there is a very large installed base of 386 brand microprocessor based computers, and some significant number of the users of such computers could have an interest in upgrading their computer by retrofiting them with either a i486 or Pentium brand microprocessor. This would be a low cost approach to improved performance. But, in order to do this and take at least some advantage of the caching built into the new microprocessors, it is necessary to develop a way of using cache memory on a computer bus that does not have the hardware to support cache memory.

The applications referenced in the Cross-reference to Related Applications section of this application describe two ways to accomplish this task. However, in order to fully understand the referenced applications and how the present invention relates to them, it is necessary to understand something of the basic computer architectures used in the IBM PC and IBM compatible (e.g. the MS DOS compatible) PC marketplace.

A computer architecture defines at the highest level how a computer system is organized for handling information. The basic elements of all computer systems are a CPU, memory, input/output ("I/O") devices and peripheral devices. All of these devices are interconnected by a bus.

At its most basic level, a bus consists of a group of conductors carrying signals that allow the system to communicate among its various devices and includes conductors carrying signals that allow the system to uniquely address memory locations as well as all addressable devices in the system. This part of the bus is called the address bus.

Once a device or memory location has been selected by the address bus, data is passed to and from the device or memory along a bi-directional data bus. The width of the data bus, for example 16 or 32 bits, is one indicator of computer performance.

Finally, a control section is needed to indicate when the data and address signals are valid since at all times after the computer is powered up there are signals on the bus: either 0 or 5 volts (or 3.3 volts in some technologies). Thus, there must be a mechanism to tell the rest of the system when the signals on the data and address bus are valid. A control bus performs this function. The control bus indicates that the signals on the address bus are now valid so all addressable components are to decode the signals on the address bus to determine which device is being addressed. Similarly, when a device responds, it sends a signal on the control bus which indicates that the signals on the data bus are now valid so that the component which is programmed to receive the data can now do so.

Taken together, these three buses are referred to collectively as the "CPU bus" or just "the bus".

The first architecture to gain prominence in the IBM PC and IBM compatible PC marketplace was the Industry Standard Architecture (the "ISA"). This architecture is used on Intel 8088 through i486 brand microprocessor based computers and has by far the greatest installed base of users.

FIG. 1 illustrates the ISA at its most basic level. Referring to FIG. 1, the computer system consists of a CPU 10 connected to all portions of bus 12. The address and control portions of bus 12 are connected to main memory controller 14. A main memory array 16 is connected to the data portion of bus 12 and to memory controller 14 through interconnect 18. On each address cycle, memory controller 14 decodes the address signals to determine if there is an address in main memory to be accessed. If a main memory access is required, memory controller 14 sends control signals to main memory array 16, which causes either a read or a write of data to the data portion of bus 12.

In addition to main memory, the CPU must communicate over the bus to peripherals such as keyboards, printers, monitors and disk drives, the direct memory access (the "DMA") controller, and various add in cards. This is accomplished by means of addressable registers called I/O devices. Each I/O device is also connected to the data and control portion of the bus. In the case of the 386 and i486 brand microprocessors, addresses are logically organized into two basic areas called "spaces": a separate I/O map called an I/O space which has 64K possible addresses and a memory space of up to 4 gigabytes. A control signal which when asserted indicates that the address to be accessed is in main memory, and when not asserted indicates I/O space. The I/O space contains the addresses of all devices that perform I/O functions. Each I/O device has a unique address in I/O space and monitors the address bus for commands. When addressed, the device decodes the command and responds to it with either a read or write operation.

In MS DOS based systems, there is a special section of memory space between address 640K and 1 meg called upper memory. Portions of this address space are reserved for specific functions such as BIOS (Basic Input Output Services) and video memory. However, there are "holes" in this space that are not reserved. These holes are called non-standard memory space. Addresses in non-standard memory space are occasionally used by system manufacturers for I/O devices.

Still referring to FIG. 1, a DMA controller (sometimes referred to as the DMA) 20 is connected to all three portions of bus 12. In ISA, the DMA controller is the device that allows all other devices to take control of the bus to access memory. The DMA is connected to all of the I/O devices in the system and acts like a gate in that an external device that seeks access to memory must first access the DMA controller.

Early computer systems had a single DMA with 4 channels: one channel for each I/O device to be controlled. To increase the number of I/O channels, a second DMA 22 was added by convention through channel 4 of DMA controller 22. This effectively increased the number of channels to 7. DMA controller 20 which is connected directly to the bus is referred to as the "master" DMA controller, and DMA controller 22 is referred to as the "slave" DMA controller since the master controls the slave's access to the bus through its channel 4. In FIG. 1, a first external device 24 and a second external device 26 may be connected to bus 12 and to channels 3 and 1 respectively of slave DMA controller 24. These devices could be for example a floppy or hard disk or a fax card and will have addresses in I/O space.

In operation, the CPU commands the DMA to monitor all of its channels to look for devices in the system that are trying to transfer data. If a channel is active, the CPU programs the DMA with the address in memory at which the data transfer is to start; the device from which the data is to be supplied, the type of operation, read or write, and the number of bytes of data to be transferred. When the controller has completed the data transfer, it sends an interrupt signal to the CPU indicating task completion. During the period after the CPU has programmed the DMA controller and the receipt of the interrupt indicating completion, the CPU is free to do other tasks. This vastly increases the productivity of the CPU.

In order to operate with a slave, the master DMA must be able to take control of the bus from the CPU and pass it through to the slave DMA. This pass through mode is called "cascade".

The DMA can in the same way as passing control to another DMA, pass control to an external device. This feature makes another class of direct access devices called "bus master devices" feasible. Historically, bus master devices were desirable since the DMA controller operates at 4 mhz. This is much slower than the 33, 50 or now 66 mhz CPU's that evolved after the ISA was selected. Thus, the DMA controller was slowing down the newer computer systems. But, backward compatibility requires that the DMA continue to operate at 4 mhz. In response, a bus master device was devised to go around the DMA controller. This led to the "bus master" device.

A bus master device is one that can acquire the bus and read and write to main memory independent of either the CPU or the DMA controller. Examples of bus master devices are SCSI hard disk controllers and fax cards. In operation, upon a request from a bus master device the DMA will take control of the bus but it will allow the bus master device to determine the address in memory that is to be written or read from. The CPU need not program the address into the DMA. Each bus master device has a unique address in the I/O space. The CPU does a write or read to that address to initiate the device, otherwise it will do nothing. The CPU monitors the status register of the device to determine if the transaction was successful. In FIG. 1, a bus master device is schematically illustrated as blocks 28 connected directly to bus 12 and also to channel 6 of DMA controller 20.

ISA based systems are not the only systems using microprocessors manufactured by Intel Corporation. While the ISA bus is by far the most widely used, it has several deficiencies. In particular, it is not sufficiently well defined to allow high performance add in devices to be used effectively. To solve this problem, IBM developed a totally new bus called the micro channel architecture (MCA) bus.

The MCA bus has several enhancements over the ISA bus. One enhancement is a much faster data transfer. A second enhancement is a dedicated bus controller that allows external devices to take control of the bus and access main memory directly.

In ISA, the DMA controller is the unit that allows any other device to get control of the CPU bus. The DMA controller acts like a gate in that an external device must talk to the DMA controller to get access to main memory. Thus everything done by the DMA is visible to the CPU.

With MCA there is no gate concept. The bus controller is not an addressable device as is the DMA controller. Rather, it is a set of logic that receives requests from any device, other than the CPU that can talk to memory and arbitrates bus access on its own. This architecture is illustrated in FIG. 2. Referring now to FIG. 2, the computer system has a MCA bus 13 which includes address, data and control signals. A bus controller 41 is tied to bus 13 by signal carrier 43. Bus controller 41 manages the transfer of information between external bus master device 44 and an external non-bus master device 46 through DMA 48 and a central processing unit (CPU) 10. From FIG. 2, it can be seen that all external devices, bus master, non-bus master and including DMA controller, achieve access to the bus through bus controller 41.

ISA in cascade mode and MCA have a similar problem. The CPU doesn't know which device is going to take control of the bus. In non-cascade mode the CPU, knows exactly where the DMA will allow access to memory. However, this cannot be done for a device in cascade mode or in MCA because that device can use nearly any of the addresses in the 64K I/O space. The CPU cannot keep track of this address. Thus a bus master card in both ISA and MCA can read or write to memory addresses unknown to the CPU.

With the foregoing background, it is now possible to examine the prior art cache coherency schemes. Ghori provides a cache coherency module ("CCM") added to the microprocessor chip that snoops the addresses put on the bus. When the CCM detects that the DMA is programmed to do a write to main memory, the entire cache is flushed and the page in main memory (in MS DOS systems, main memory is divided into pages of 64K bytes) that is being written to is kept non-cacheable until the data write is complete. Completion of the data write is determined by monitoring the application software's interrogation of the DMA status register with a software initiated interrupt. The cache is turned off completely when cascade mode is implemented since the CPU does not know which areas of memory may become incoherent. For the same reasons, the Ghori scheme does not work with MCA systems either. In addition, there is a problem with determining the end of a data transfer with the Ghori scheme. Ghori relies on an access by the application software to the DMA status register to signal the end of a data transfer. But, not all application software actually checks the status of the DMA controller for completion of a data transfer. Thus, in cases where the application software does not read the DMA status register, either the entire cache remains off indefinitely or the non-cacheable pages of memory would remain uncacheable for an indefinite period of time and performance would suffer. In addition, the Ghori scheme requires considerable additional logic and memory to keep track of the noncacheable pages. This causes an increase in die size which translates into a more expensive device. Finally, Ghori does not provide hardware to turn the cache memory on after a reset not to specify the parts of main memory that are cacheable.

The Kulkarni application cross-referenced above deals with writeback cache coherency for systems having busses that either support writethrough caching only or no caching at all on the bus; however this application does disclose a method of dealing with cacheable memory size for writeback cache control systems.

SUMMARY OF THE INVENTION

It is therefore an object of the invention to provide a writethrough cache coherency control module and method that is less expensive than those in the prior art;

It is another object of the invention to provide a writethrough cache coherency control module and method that supports bus master devices;

It is another object of the invention to provide a writethrough cache coherency control module and method that supports MCA systems;

It is another object of the invention, to select a fool proof way of detecting the end of a data transfer by an external device;

It is another object of the invention to provide a writethrough cache coherency control module and method that automatically turns on the cache at the proper time; and It is another object of the invention to provide a writethrough cache coherency control module and method that automatically determines the cacheable memory space.

These and other objects of the invention are achieved by a method of maintaining cache coherency in a computer system which has the following components: a bus that does not contain bus cache support hardware, a CPU, a cache memory connected directly to the CPU, a main memory space, an I/O address space, a plurality of addressable devices some portion of which have standard addresses in I/O address space, a DMA controller having registers programmable by the CPU to allow external I/O devices to access main memory and a status register monitoring the progress of such access by the external I/O device. The computer system supports a conventional interrupt scheme including standard and non-standard interrupts.

The method of the present invention consists of detecting the period of time during which the DMA controller is programmed to allow an external device to write to main memory. The cache memory is flushed at the end of the period of time during which the DMA controller is programmed to allow an external device to write to main memory. In addition, the method detects all reads to non-standard I/O space made by the CPU during the time during which the DMA controller is programmed to allow an external device to write to main memory and flushes the cache memory after each detection of a read to non-standard I/O space made by the CPU during that time period.

The apparatus of the present invention which is used to implement the method of the present invention is a cache coherency module which consists of a bus snooping sub-module connected to the bus for monitoring address, control and data signals on the bus; a DMA address table containing the addresses of registers of the DMA controller; a system address table containing at least the addresses of all standard I/O devices; a logic sub-module connected to the cache memory and the bus snooping sub-module and communicating with the DMA address table and the system address table. The logic sub-module uses the information in the various tables to interpret the monitored bus signals and indicate the period during which the DMA controller is programmed to allow the external I/O device to write to main memory and indicates when a non-standard I/O address has been read by the CPU and supplies a signal to the cache memory causing the flush thereof upon the indication that a non-standard I/O read has occurred while the DMA is programmed to allow the external I/O device to write to main memory and supplies a signal to the cache memory causing it to flush at the end of the period that the DMA is programmed to allow the external I/O device to write to main memory.

According to another aspect of the invention, the cache coherency module is further adapted to recognize the presence of a bus master device in the computer system and thereafter to always supply a signal to the cache memory causing it to flush upon the indication of a non-standard I/O read, or a non-standard interrupt regardless of the status of the DMA controller.

According to another aspect of the invention, the cache coherency module system address table includes the addresses of battery backedup memory and the keyboard port and the logic sub-module has cache on/off logic which indicates when the application software accesses the battery backup memory or keyboard port and interprets the access as either a warm reset or cold reset request by the application software, and turns on the cache memory immediately upon detection of a warm reset and after computer system self test has run if a cold reset.

According to another aspect of the invention, the cache coherency module is further characterized by logic for recognizing that the computer system is a MCA system and adapted to recognize the presence of a bus master device in the MCA computer system and thereafter to always supply a signal to the cache memory causing the flush thereof upon the indication of a non-standard I/O read, or a non-standard interrupt regardless of the status of the DMA controller if there is a bus master card in the system.

According to another aspect of the invention, the system address table contains a backup battery memory address lookup table containing addresses in memory giving the configuration of installed conventional memory and extended memory. This information is used to define the cacheable memory space.

BRIEF DESCRIPTION OF THE DRAWING

The present invention will now be described in more detail in conjunction with the Drawing, wherein.

9

FIG. 5 is a DMA address table; and

FIG. 6 is a table of system addresses; and

FIG. 7 is a is a logic flow chart of the cache coherency module; and

Figure 8:
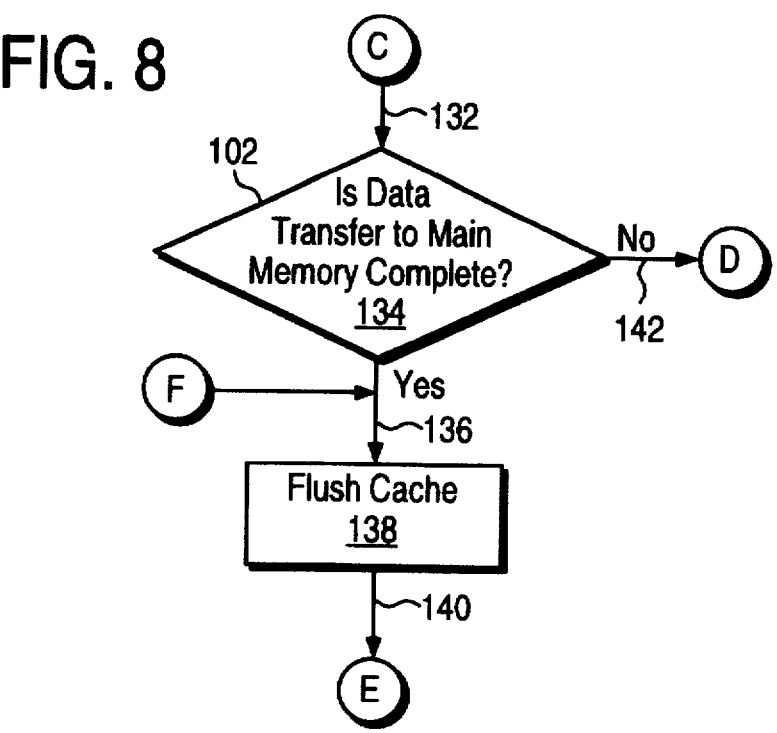

FIG. 8 is a continuation of the logic flow chart of FIG. 7; and

Figure 9:
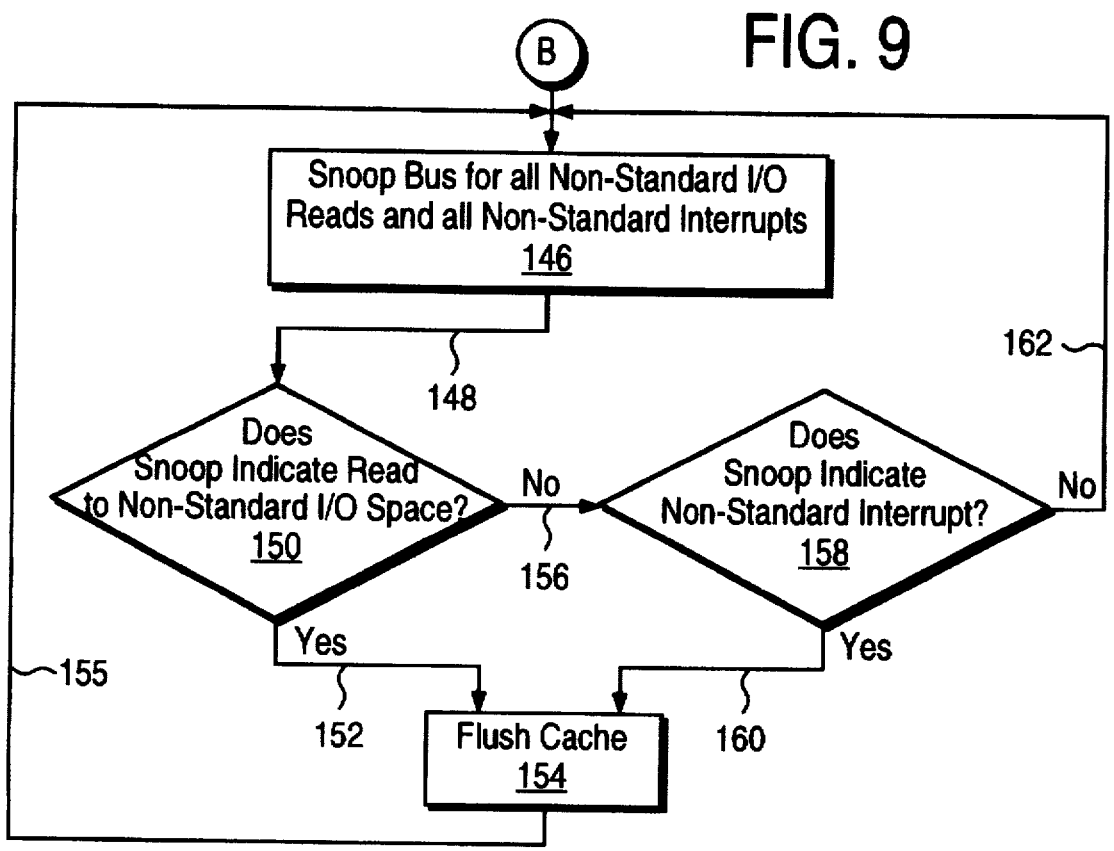

FIG. 9 is a continuation of the logic flow chart of FIG. 7; and

Figure 10:
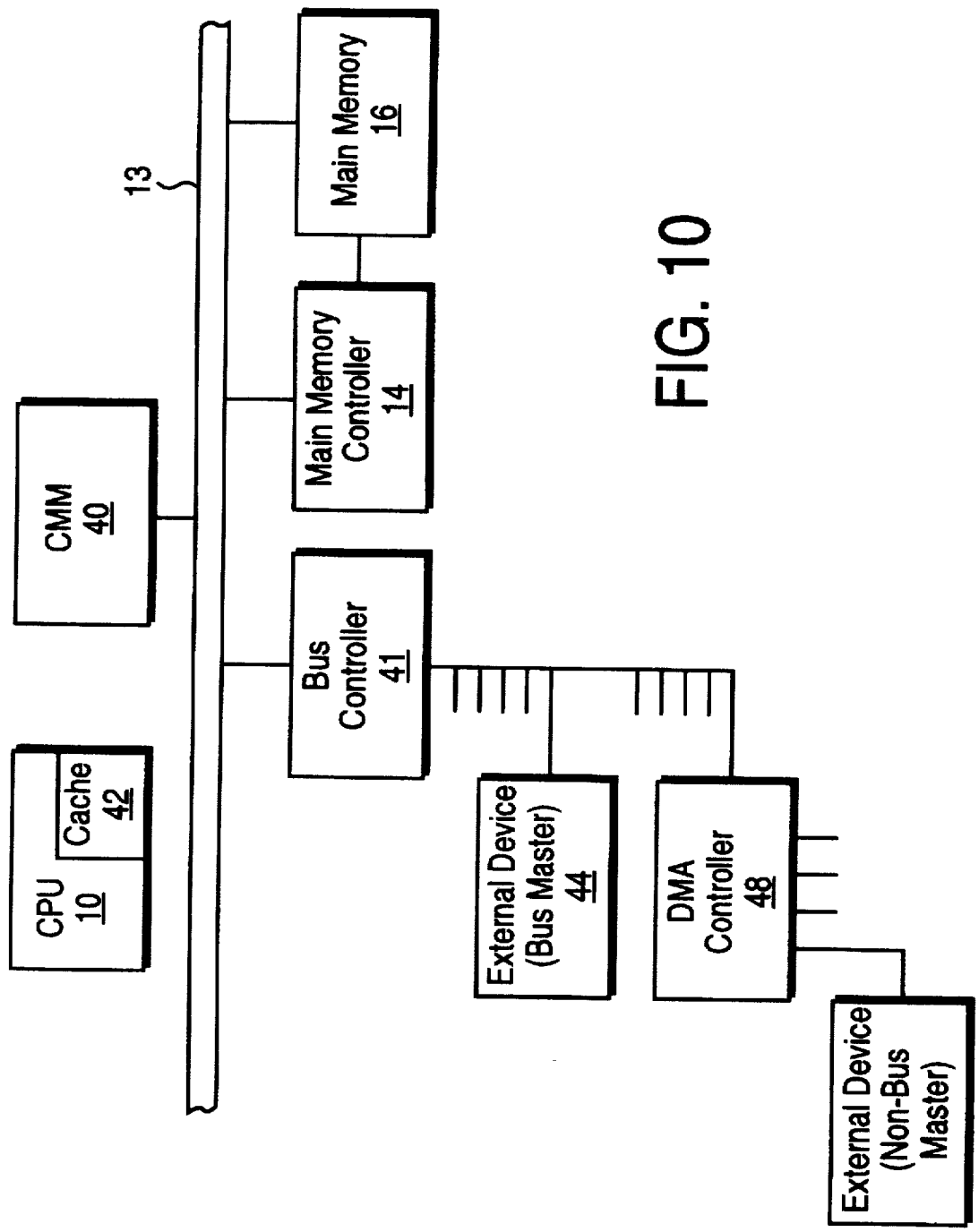

FIG. 10 is a block diagram of a MCA computer system including the cache coherency module of the present invention;

FIG. 11 is a table of the addresses and information stored in that portion of memory that has a battery backup; and FIG. 12 is a flow chart of the cache coherency scheme selection process according to the present invention.

DETAILED DESCRIPTION OF THE PREFERRED EMBODIMENT

The present invention is directed to a writethrough cache only. Thus, there is no possibility for cache incoherency in the cache when an external device is reading from main memory since the CPU writes back to main memory each time it modifies the cache. However, when an external device writes to main memory, there is a possibility of cache incoherency. Yet, there are no special bus signals to indicate when this condition occurs. Thus, it is necessary to look to other possible sources of information.

An important aspect of the present invention is to recognize and take advantage of the information that can be obtained by monitoring certain actions made by the application software. That is, all writes to memory are requested by application software which has a need for the data being written to main memory. During the period when the write to memory is taking place, it can be assumed that the controlling application software will not attempt a read memory until the data transfer is complete. Otherwise it may get erroneous data. This is a safe assumption since if it were otherwise, the application software would get a bad result in any circumstance. That is, there could be an error with either a no cache system, with the Ghori method or with the method of the present invention.

So, the software requesting the transfer will make sure that the device from which the data transfer is coming has completed the transfer and indicated transfer complete to the CPU before the software moves on. This is accomplished by reading the status register of the device that is doing the writing. This check appears on the bus as a read to non-standard I/O space and it is this that the present invention can detect and use to good advantage.

The Ghori scheme requires much more hardware because it does not take advantage of the intelligence of the application software.

The present invention requires a knowledge of the system devices accessing main memory for a write operation. In ISA and MCA systems, the devices that can do this are: the CPU, the DMA and bus master cards. Thus, the hardware of the present invention is designed to detect when such an event is occurring.

Figure 1:
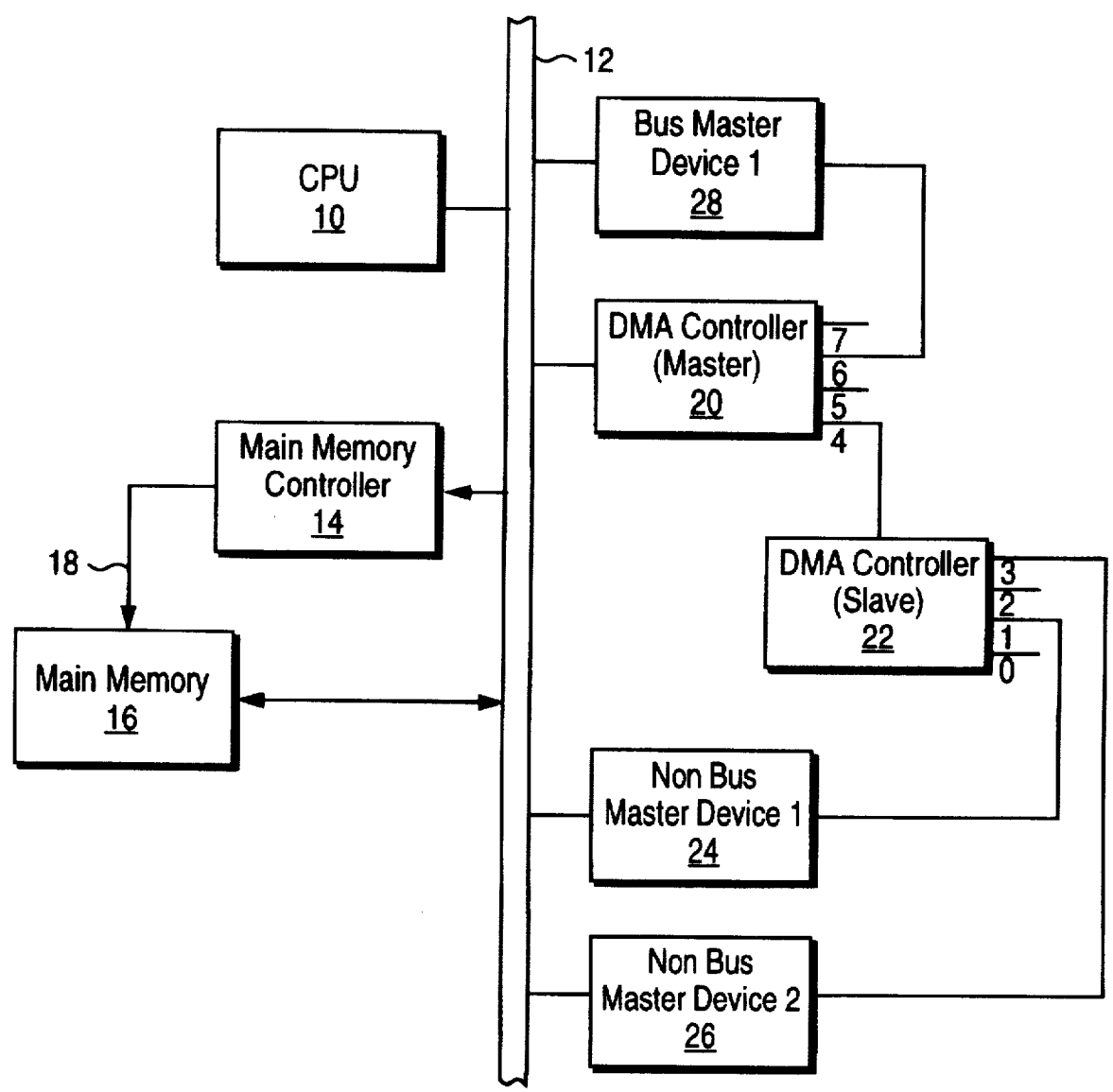
FIG. 1 is a block diagram of a prior art ISA computer system.
Figure 2:
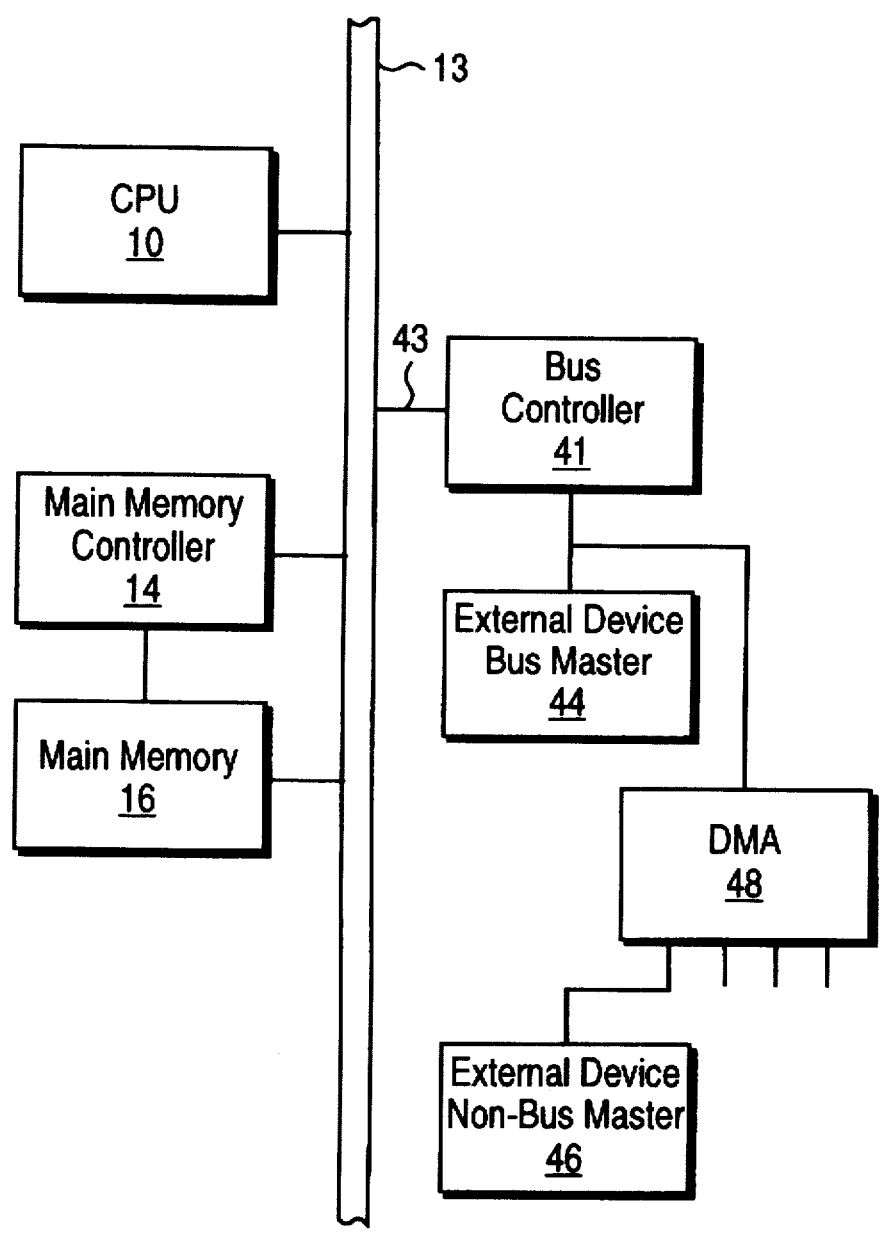
FIG. 2 is a block diagram of a prior art MCA computer system.
Figure 3:
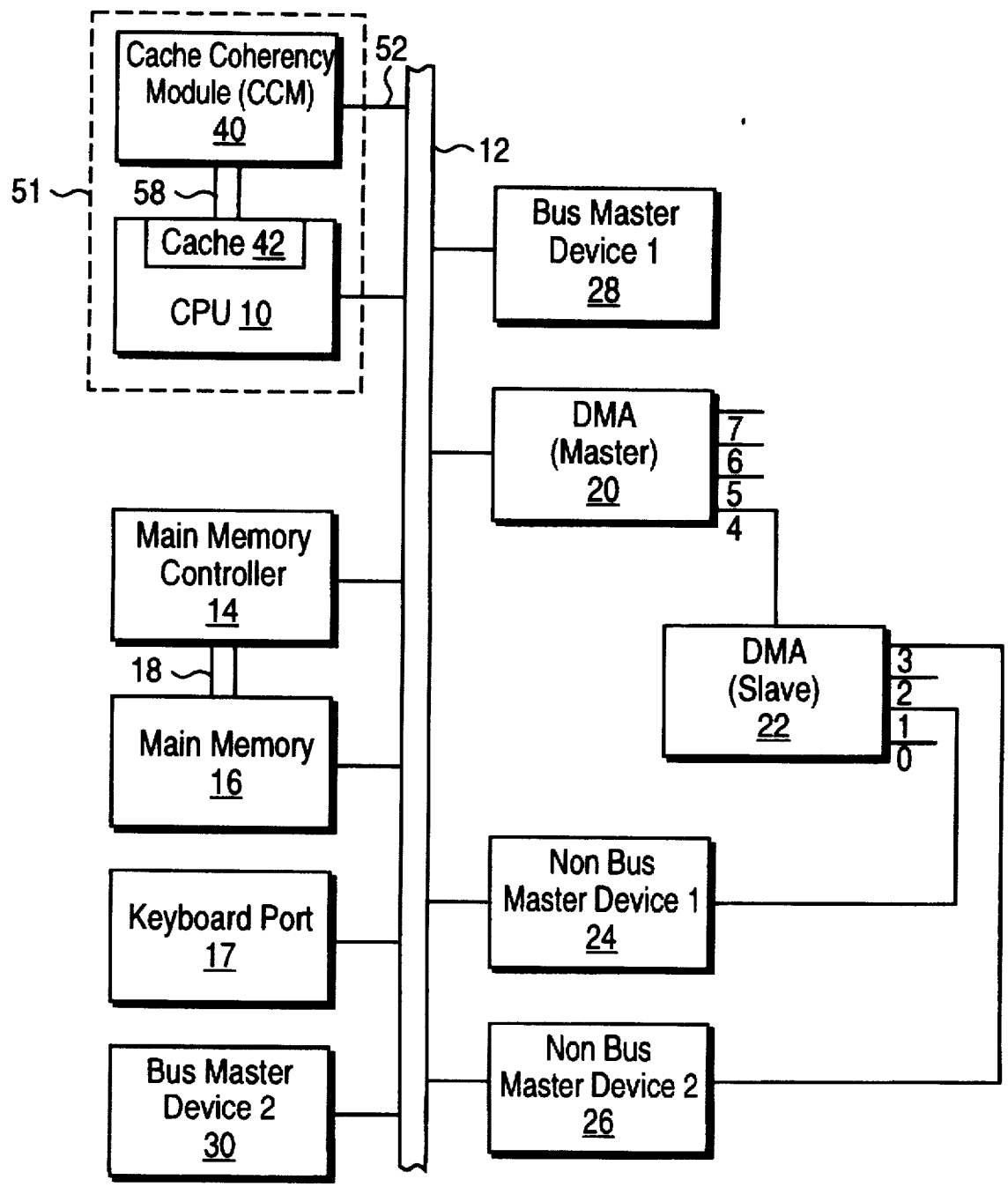
FIG. 3 is a block diagram of an ISA computer system including the cache coherency module of the present invention.

In the present invention, a coherency module (CCM) 40 is added to the computer system architecture as illustrated in FIG. 3. This logic may be implemented as a gate array, custom integrated hardware or microcode embodiment using conventional techniques. In a preferred embodiment, it is on the same chip as the CPU and cache memory as indicated by dotted line 51. CCM 40 is connected to all

10 portions of bus 12 by line 52 and to cache memory 42 through line 58.

Figure 4:
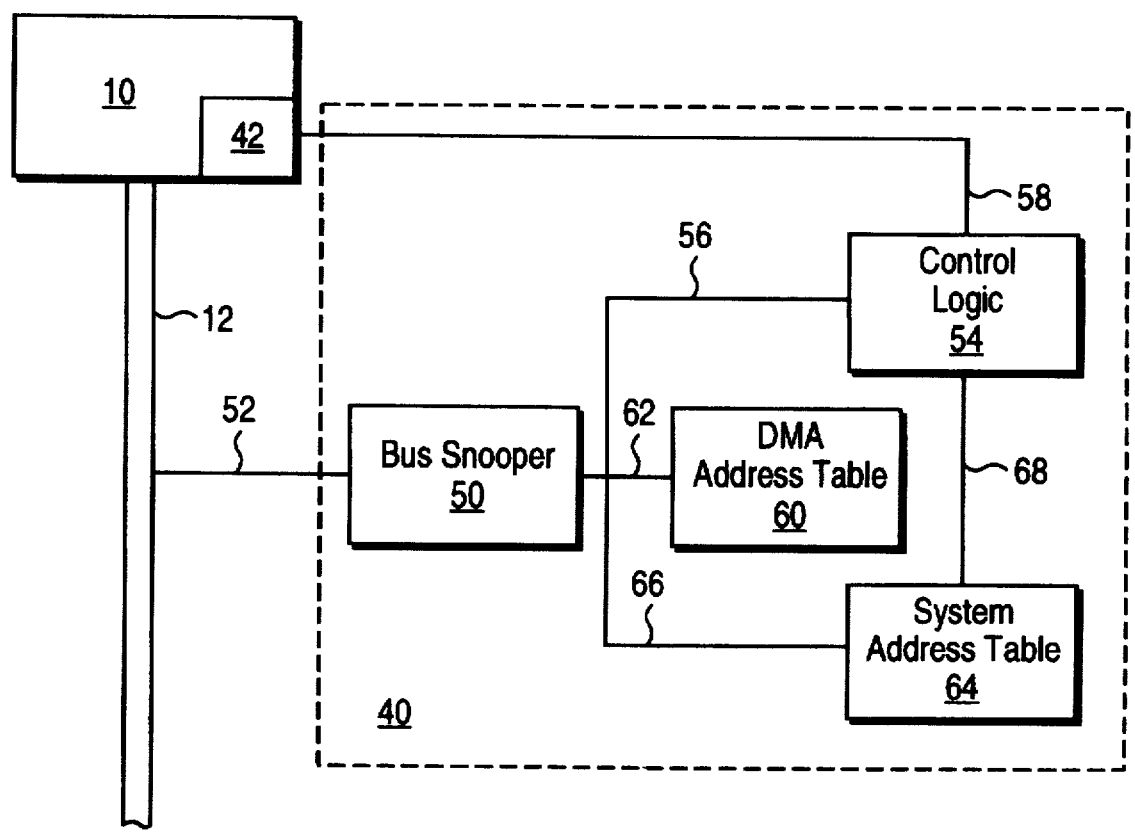
FIG. 4 is a block diagram of the internal architecture of the cache coherency module.

FIG. 4 is a block diagram of the internal architecture of CCM 40. Referring to FIG. 4, CCM 40 comprises a bus snooper 50 coupled to bus 12 via line 52. Bus snooper 50 receives and interprets address, data, and control signals. Bus snooper 50 is coupled to control logic 54 on line 56. Control logic 54 comprises circuitry for generating cache control signals on line 58 to CPU 10.

DMA controller address table 60 is coupled to bus snooper 50 by line 62. System address table 64 is coupled to bus snooper 50 by line 66 and control logic 54 by line 68. DMA controller address table 60 comprises a list of addresses corresponding to registers for DMA controllers 20 and 22. These register addresses are set out in FIG. 5. The registers are used by CPU 10 to program DMA controllers 20 and 22 for an access to main memory 14. CPU 10 accesses the registers of FIG. 5 by putting an address of the desired register on bus 12.

Any DMA address presented on bus 12 is monitored by bus snooper 50. By comparing the address received by bus snooper 50 with the address in DMA controller address table 60, bus snooper 50 may determine if an address presented on bus 12 is an access to one of the registers of DMA controller 20 or 22 set out in FIG. 5. In this manner, bus snooper 50 determines when CPU 10 is programming a DMA controller for an access to main memory 14. This information is passed to control logic 54.

Each channel of the DMA has addressable control registers that must be programmed by the CPU before the DMA will cause a data transfer: (1) the channel must be unmasked so that the DMA will start sampling its inputs for requests to do data transfers; (2) the mode register must be programmed; and (3) global enable/disable bit must be enabled. In all MS DOS compatible systems, the DMA registers have precisely the same address in I/O space. Thus they may be monitored which makes it possible to determine when the DMA is programmed to perform a write to memory. Also, in all MS DOS compatible systems, the end of a data transfer is indicated by: an interrupt, a read to I/O space or a read to non-standard memory space for memory mapped devices.

The present invention recognizes that in an ISA system there are two basic configurations, each requiring a different cache coherency strategy.

The first configuration consists of a system in which there are no bus master devices. If this is the case, only the CPU and DMA can access memory. CCM 40 automatically detects the presence of a bus master device by determining if any DMA channel other than channel 4 is programmed to be in cascade mode. This is accomplished by monitoring the DMA's 8 bit mode register which indicates the mode for each channel.

CCM 40 monitors bus 12 to determine when either DMA controllers 20 or 22 is being programmed by CPU 10 for access to main memory 16. CCM 40 also monitors bus 12 to determine when there is either an interrupt, or a read to I/O space. Such an event may, but will not necessarily, indicate the end of the data transfer. If an interrupt occurs, CCM checks the status registers of DMA 20 and 22. If the status register indicates that the data transfer is complete, the cache is flushed. On the other hand, if the DMA status register indicates that data transfer is still in process, no action takes place and the CCM continues to look for interrupts and reads to I/O space.

It may be however that a read to I/O space occurs before detection of data transfer completion at an interrupt time.

This I/O read may but does not necessarily indicate an end of data transfer. Thus, another important element of the invention is the recognition and use of the fact that, in addition to the DMA, there are several other system devices that have standard addresses in I/O space and memory space. These are the mother board devices other than a DMA slave. And none of these devices have the ability to modify memory. Thus, a read to a device in standard I/O space other than to the DMA can have no effect on data coherency and can be ignored.

However a read to non-standard I/O space could come from the device transferring data, or from some other device not transferring data. CCM 40 cannot tell which. Thus, to make absolutely sure that data remains coherent, the CCM must assume that a read to non-standard I/O space indicates an end of data transfer. CCM 40 then flushes the entire cache memory. This process occurs each time a read to non-standard I/O space occurs until there is a conclusive indication that the data transfer is complete.

In a manner analogous to reads to non-standard I/O space, reads to non-standard memory space could also indicate the end of data transfer by a device whose address is in non-standard memory space.

FIG. 6 is a table of the addresses of standard and non-standard I/O space, the addresses of standard and non-standard memory space and a table of standard and non-standard interrupts.

A conclusive indication that the data transfer is complete occurs: (1) when the DMA status register so indicates or (2) when the DMA is reprogrammed by the CPU for an operation other than a write to main memory.

On each hardware interrupt and on each system timer interrupt (which occurs approximately every 50 microseconds), CCM 40 polls the DMA status registers. Because any check of the DMA status register is destructive, i.e., it clears the status bit, the check by CCM 40 is potentially a problem for those applications software packages that also check the DMA status register. To solve this problem according to the present invention, each time CCM 40 reads the DMA status register (in contrast to a read by the applications software), it makes a local copy of what the status was immediately before it was polled. Thus, if any application software attempts to poll the DMA status register, snooper 50 detects the access and CCM 40 provides a signal to bus 12 that is the logical OR of the contents of the local copy and the current DMA status. The local copy is cleared on DMA operations that also clear the DMA. CCM 40 also polls the DMA status register immediately upon determining that the DMA is programmed for a write to main memory. This clears any stale status bits from the register.

CCM 40 detects a change in DMA programming in the same way that it detects the initial programming of the DMA.

As illustrated in FIG. 5, the DMA controller 20 and 22 support up to 7 different channels. Any one of these channels may be independently programmed by CPU 10. DMA register addresses for each individual channel are maintained in DMA controller address table 60, bus snooper 50 can determine when any particular channel of DMA controller 20 or 22 is being programmed by CPU 10. In addition, bus snooper 50 can monitor the address presented on bus 12 to determine if CPU 10 is requesting status from a status register of a particular channel of DMA. And bus snooper 50 can read the status returned by the DMA from the data portion of bus 12. In this manner, bus snooper 50 monitors DMA controllers 20 and 22.

Referring to FIG. 5, an address of 0000h ("h" refers to hexadecimal) presented on bus 12 corresponds to the memory address register of DMA channel 0. Address 0001h corresponds to the transfer count register of DMA channel 0. The memory address register and the transfer count register are control registers for DMA channel 0. If CPU 10 addresses either of these control registers, bus snooper 50 interprets this access as an attempt by CPU 10 to program channel 0 for an access to main memory 16. Address 000Bh corresponds to the mode register for DMA channels 0–3. The mode register is a control register for channels 0–3. If a mode register is addressed and a write mode for a particular channel is enabled, bus snooper 50 interprets this condition as the programming of that DMA channel for a write to main memory 16.

FIGS. 7–9 illustrate a portion of the logic implemented within CCM 40. In a preferred embodiment, this logic is implemented on the same chip as the CPU and cache memory. Referring now to FIG. 7, in processing block 100, bus snooper 50 monitors address and control signals for each bus cycle. In decision block 102, the CCM tests the monitored address and control information and determines if the DMA is programmed for a write to main memory. If yes, processing path 104 is taken to decision block 106. If, however, the bus cycle is not a memory write request, no action is taken and bus snooper 50 continues to snoop as indicated by feedback path 108. The next step in the process as indicated by decision block 106 is a determination by CCM 40 if the monitored control information indicates a DMA controller with no channels in cascade other than channel 4. If yes, follow processing path 110 to processing block 112. At this stage of the process, CCM 40 has determined that the DMA is programmed to write to memory and the program commences looking for reads to I/O space, interrupts and changes in the programming of the DMA as indicated by processing block 112. From processing block 112 follow process path 114 to decision block 116. In this process step, system address table 64 and DMA address table 60 are used to determine if one the foregoing events has occurred. When an event in processing block 112 is detected, process path 114 is taken to decision block 116 where CCM 40 again uses the information in DMA address table 60 and system address table 64 to determine if the event is a change in DMA programming. If yes, follow process path 118 to FIG. 8. If the event was not a change in DMA programming, follow process path 119 to decision block 120 where CCM 40 uses information in system address table 64 to determine if the event was a read to non-standard I/O space. If yes, follow process path 121 to processing block 122 and flush the cache. At this point in the process, the cache memory is flushed since the read to non-standard I/O space may indicate an end to the data transfer. After the flush command has been supplied to cache memory 42 via line 58, processing path 123 is taken back to processing block 112. If the event is not a read to non-standard I/O space, follow process path 124 to decision block 125. In decision block 125, CCM 40 uses system address table 64 to determine if the event was a hardware interrupt. If no, take process path 126 and return to processing block 112 where CCM 40 continues to snoop the bus looking for the next defined event. If yes, process path 128 is taken to processing block 130 and the DMA status register is polled.

Referring now to FIG. 8, after polling the DMA status register, follow process path 132 to decision block 134 where CCM 40 determines if the data transfer is complete. If yes, follow processing path 136 to processing block 138 where the cache is flushed. Then follow processing path 140 back to the beginning of the process in FIG. 7. If no in decision block 134, follow process path 142 back to point D in FIG. 7 and continue to snoop for hardware interrupts.

Referring again to FIG. 7 and decision block 106, if the decision is no, follow decision path 144 to FIG. 9. Referring now to FIG. 9, if the DMA is in cascade mode for other than channel 4, there my be a bus master device in the system. CCM 40 cannot tell. But because CCM 40 cannot tell if there is or is not a bus master device, it must assume that there is. So to insure data coherency, CCM 40 must flush cache 42 on every indication that the bus master device has finished writing to main memory. It does this by monitoring bus 12 for all reads to non-standard I/O space and all non-standard interrupts since either may signal an end to data transfer to main memory. Accordingly, in processing block 146, CCM 40 snoops bus 12 for all reads to non-standard I/O space and all non-standard interrupts. From processing block 146, follow process path 148 to decision block 150. In this process step, the information in system address table 64 is used to determine if a read to non-standard I/O space has occurred. If yes, follow process path 152 to processing block 154 and flush cache memory 42. Then, follow processing path 155 back to processing block 146 and continue snooping. If the decision in decision block 150 is no, follow process path 156 to decision block 158. In this process step, again the information in system address table 64 is used to determine if a non-standard interrupt has occurred. If yes, follow process path 160 to processing block 154 and flush cache memory 42. Then, follow processing path 155 back to processing block 146 and continue snooping. If the decision in decision block 158 is no, follow process path 162 to decision block 146 and continue snooping.

As mentioned previously, a few system manufacturers use non-standard memory space to as addresses for I/O devices. Thus, in an alterative embodiment of the present invention, CCM 40 also snoops bus 12 for writes to non-standard memory. If such a write is detected it is treated exactly as a read to non-standard I/O space. More specifically, processing box 112 in FIG. 7 and processing block 146 in FIG. 9 would also monitor bus 12 for reads to non-standard memory; and a fourth decision block would be added to FIG. 7 and a third decision block to FIG. 9 to test for a read to non-standard memory. Upon detecting such a read, cache memory 42 is flushed.

FIG. 10 is a block diagram of the computer system architecture of the present invention used with an MCA system and all corresponding reference numerals remain the same. Referring now to FIG. 10, the computer system of the present invention has a conventional MCA bus 13 which includes address, data and control signals. In the preferred embodiment, bus 13 is used with either the Pentium or i486 brand microprocessor manufactured by Intel Corporation.

As mentioned previously, in the case of an MCA system, bus controller 41 arbitrates access to bus 13 and controls which device will have access to main memory and where data will be accessed—all of which is done without the knowledge of the CPU. In this circumstance, it is impossible for CCM 40 to snoop bus 13 and determine when a write to memory will either begin or end. Thus, as in the case of ISA in cascade mode, CCM 40 must assume that all reads to non-standard I/O space indicates an end to a data transfer and flush the cache. Upon detecting the system was MCA, CCM 40 follows the process set out in FIG. 9.

In Intel based 386DX systems, physical memory is partitioned into conventional memory and extended memory. Conventional memory ranges from address 0 through a maximum of address 640K. However, conventional memory may be less than address 640K. The extended memory starts at address 1 Meg and goes through the top of the installed memory. These two memory ranges are cacheable. The remainder of memory is non-cacheable. The memory from 640K through 1 Meg is reserved for the BIOS (Basic Input Output Services) and several other system level programs. According to the present invention the size of cacheable memory is automatically determined by CCM 40. The aid of a software utility is not required. Thus any product using the present invention is "plug and play".

The present invention takes advantage of the fact that in ISA systems, the system configuration details are stored in a battery back-up memory and accessible through I/O ports 0070h and 0071h. According to the invention, CCM 40 snoops the accesses to I/O ports 0070h and 0071h and stores the memory size information in the system device address during the boot sequence of the system. FIG. 11 shows the addresses that store memory size information.

In Intel brand 386DX based computer systems, a reset turns off the cache and there is no foolproof way to turn it back on. This is fine for systems not designed for a cache memory. But in upgrade systems that have cache, the cache must be turned on after a reset. In ISA systems, there are two types of resets: cold and warm. In a cold reset, the power on self test is run and the operating system booted. In a cold reset, a software utility can be installed to turn on the cache. In a warm reset, power on self test is not run. Thus, a software utility will not work. According to the present invention, the cache is turned on after every reset without the use of a software utility. The information at battery backup address 0Fh specifies which kind of reset has occurred. Data in addresses 00h through 04h indicates a cold reset. Data in addresses 05 through 0F indicates a warm reset. All BIOS's must read this information in order to determine if the last reset was cold or warm. In addition, some BIOS's also read the Keyboard port 17 of FIG. 3 (I/O read 0064h) and examine bit 2 which if 0 indicates a cold reset and a 1 indicates a warm reset.

According to the present invention, CCM 40 snoops the access by BIOS software to the keyboard port 17 of FIG. 3 and the backup memory location 0Fh. If a cold reset is detected, then BIOS executes power on self test and then causes software INT 19h to perform boot and if warm reset is detected then control is passed onto a predetermined location in memory. For cold resets, the cache memory is kept off until the first software INT (interrupt) 19h is detected. The software interrupt instruction 19h is used by all ISA compatible computers to boot the operating system. This instruction occurs after the power on self test (the "POST") program is successfully completed. During the first INT 19h the cache is turned on. For a warm reset, the cache memory is turned on immediately after warm reset is detected.

FIG. 12 is a flow chart for determining which coherency scheme to use. As shown in FIG. 12, once the system is booted as indicated by processing block 174, CCM 40 detects whether the system is MCA or ISA. This is done by monitoring channel 4 of the DMA. If this channel is in cascade mode, the system is ISA. Otherwise it is MCA.

If the system is MCA, take process path 180 to decision block 182 and check to see if there are any bus master cards. In a MCA system, this is done by CCM 40 by monitoring .ADF files (Adapter Descriptor Files) where bus master card configurations, if any, are stored. If there are no bus master cards, take process path 184 to the beginning of the flow chart as set out in FIG. 7. If a bus master card is detected, follow process path 186 to the beginning of the flow chart as set out in FIG. 9.

If CCM 40 determines that the system is ISA, follow process path 190 to decision block 192 where CCM 40 tests for bus master cards. This is done in an ISA system by determining if any DMA channel other than 4 is programmed for cascade mode. If yes, there are bus master cards in the system. If there are bus master cards, follow process path 194 to the beginning of the flow chart as set out in FIG. 9. If there are no bus master, cards, follow process path 196 to the beginning of the flow chart as set out in FIG. 7.

The partitioning of components illustrated in the various Figures is a logical partitioning and was presented for ease of understanding. The various functions indicated by a particular block could as well be incorporated into one of the other logical blocks.

Although the present invention is described herein with reference to a specific embodiment, many modifications and variations therein will readily occur to those skilled in the art. Accordingly, all such variations and modifications are included within the intended scope of the present invention as defined by the following claims.

What is claimed is:

1. A method to maintain cache coherency in a computer system, the method comprising the steps of:

(a) determining a cacheable range of a main memory in the computer system;

(b) detecting a CPU programming a DMA controller to transfer data to the main memory;

(c) detecting conclusion of the data transfer and flushing a cache coupled to the CPU in response; and (d) detecting the CPU reading a non-standard address during the time interval between steps (b) and (c) and flushing the cache in response.

2. The method of claim 1 wherein said step of determining a cacheable range of a main memory comprises the step of detecting the CPU accessing a configuration memory during start-up of the computer system, the configuration memory containing the highest address of the cacheable range of the main memory.

3. The method of claim 1 further comprising the step of enabling the cache after a reset of the computer system.

4. The method of claim 3 wherein said step of enabling the cache after a reset of the computer system comprises the steps of:

detecting whether the reset is a cold reset or a warm reset;
   if the reset is a warm reset, enabling the cache; and
   if the reset is a cold reset, detecting a software interrupt 19h and enabling the cache in response to the software interrupt 19h.

5. The method of claim 4 wherein said step of detecting whether the reset is a cold reset or a warm reset comprises the step of snooping a data value read by the CPU from address 0Fh of a battery backed-up memory, the data value indicating whether the reset is a cold reset or a warm reset.

6. The method of claim 4 wherein said step of detecting whether the reset is a cold reset or a warm reset comprises the step of snooping a data value read by the CPU from a keyboard port, the data value indicating whether the reset is a cold reset or a warm reset.

* * * * *